Patented Apr. 23, 1940

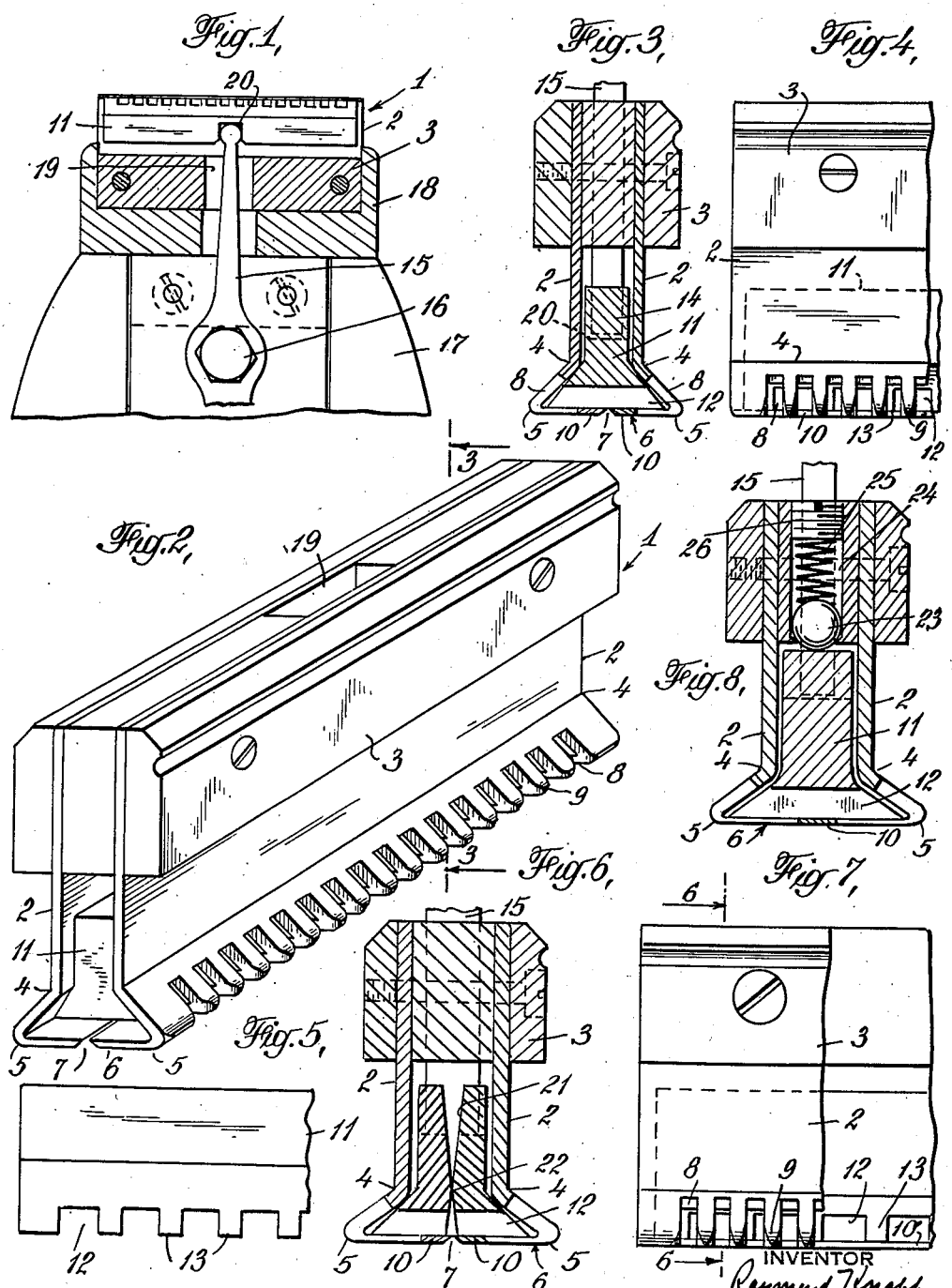

2,198,118

UNITED STATES PATENT OFFICE 2,198,118

HAIR CLIPPER

Raymond Knapp, Long Island City, N. Y., assignor to Knapp-Monarch Company, St. Louis, Mo., a corporation of Missouri Application March 16, 1937, Serial No. 131,149

9 Claims. (Cl. 30—43)

This invention relates to hair clippers of the type intended primarily for clipping hair on the face and therefore commonly known as "dry-shavers." The object of the invention is to provide improved shearing elements for clippers of this type which shall be less expensive to manufacture than those heretofore made and which embody novel and simple means for urging the movable cutter into shearing contact with the fixed shearing elements and automatically compensating for wear.

In the accompanying drawing illustrating certain preferred embodiments of my invention, Figure 1 is a view partly in section showing the cutter head of a hair clipper in which is mounted the shearing element assembly of my invention; Figure 2 is a perspective view of the shearing element assembly detached from the cutter head; Figure 3 is a transverse section taken along line 3—3 of Figure 2, but showing the reciprocating lever arm for the movable cutter in position; Figure 4 is an elevation of one end of the shearing element assembly; Figure 5 is a detailed elevation of one end of the movable cutter; Figure 6 is a transverse section similar to Figure 3, but showing a modified form of the movable cutter; Figure 7 is an elevation similar to Figure 4 of one end of the shearing element assembly shown in Figure 6, and Figure 8 is a transverse section similar to Figures 3 and 6 but showing a modified form of the assembly which is fully claimed in my copending application, Serial No. 173,104, filed November 6, 1937.

In the drawing I represents the shearing element assembly comprising two spring steel plates 2, clamped between blocks 3, the middle one of which serves to space the plates apart. The outer end of each plate is bent outwardly at 4 and inwardly at 5, the outer bent portions 6 lying in substantially the same plane and bridging the space between the plates except for a slot 7. These outer bent portions 6, constituting the fixed cutter of the clipper and making contact with the skin, are made somewhat thinner than the other parts of plates 2. Each plate is provided with a plurality of narrow, closely spaced slots 8 extending through and transversely of the outer bends and forming shearing teeth 9, these slots terminating at one end adjacent the bend 4 and at their other end adjacent the end of the plate, leaving an unslotted supporting strip 10 across the end of each plate. The teeth at their outer bends are slightly beveled to widen the mouths of the slots 8 and facilitate the entry of hairs. Mounted within and substantially filling the space between the bent portions of the plates 2 is a movable cutter 11 provided with a plurality of transverse slots 12 forming shearing teeth 13 which make shearing contact with the inner faces of the teeth 9. In shape the movable cutter 11 approximates that of a T-bar with diagonal planes sloping from the edges of the flanges to the web 14. This web, as shown most clearly in Figure 3, is of less thickness than the space between the plates 2. The shape of this shearing element assembly with its outwardly extending bent teeth on the fixed cutter and its pointed teeth on the movable cutter lying within the bends of the fixed teeth, makes it possible to guide the hairs to the shearing zone in a substantially upright position.

The spring steel plates 2 are so mounted between the blocks 3 as to press inwardly upon the sloping side faces of the movable cutter 11 and thus continuously urge the teeth 13 into shearing engagement with the teeth 9. As the parts wear, the ends of the plates 2 move closer and closer together, but the operative contact between the shearing elements remains unimpaired. The slot 7 and the spaces between the web 14 and the plates 2 are of sufficient width to permit this inner wear-compensating movement of the plates 2. The pressure exerted by the plates is a light one and is sufficient to compensate for wear and hold the parts against chattering while offering no substantial resistance to the reciprocation of the cutter.

This reciprocation is effected by means of an arm 15 oscillated about a pivot 16 by means of a motor not shown but housed within the handle 17 of the clipper. The arm 15 extends through cutter head 18, through a slot 19 in the middle block 3 of the shearing element assembly and terminates within a notch 20 in the web 14 of the movable cutter 11.

If for any reason, as for example improper assembly, the two outer bent portions of the plates 2 should not lie in exactly the same plane, the movable cutter would, of course, make shearing contact with only one set of fixed shearing teeth. This danger may be avoided by making the inner cutter in two parts as shown in Figures 6 and 7. The cutter is split longitudinally and vertically through the web, the inner faces 21 being made convex and normally contacting along the line 22. In the event of any misalignment of the outer ends of the plates 2, the two halves of the cutter will automatically adjust themselves so that both of them will make shearing contact with the fixed teeth.

The plates 2 being made of spring steel can be bent and slotted by stamping operations, and the expensive machining heretofore necessary in making the fixed shear plates of dry shaver hair clippers, avoided. It is necessary only to grind the outer bent portions 6 to reduce their thickness, and to give the teeth a slight bevel at their bends. The movable cutter with its widely spaced teeth presents no serious manufacturing problem. I also take advantage of the fact that the plates are made of spring steel to eliminate the usual spring pressed pins which urge the movable cutter into shearing contact with the fixed shearing element and thus further decrease the cost of manufacture of the device.

In Figure 8 I have illustrated a shearing element assembly similar to those shown in the other views except that the plates 2 are of one piece, the separate portions 6 of the other forms constituting a single fixed and relatively thin shear plate or cutter. I cannot, therefore, rely here upon the resiliency of the plates to urge the movable cutter into shearing contact with the fixed cutter, and so employ balls 23 mounted within bores 24 in the center bar 3 and pressed against the rear of the movable cutter by springs 25 seated upon screws 26.

Although the clipper of my invention is primarily intended for "dry-shaving" it can also be used for clipping long hair.

I claim:

1. A hair clipper comprising two spaced plates having their end portions bent outwardly and then inwardly toward each other and terminating with a space between their edges, the inwardly bent portions lying in substantially the same plane, slots in each of said plates extending through and transversely of the outer bends, a movable cutter substantially filling the space between the bent portions of the plates and provided with spaced teeth making shearing contact with the slotted portions of the plates, said bent portions being movable toward and from each other to fit the width of said cutter and means for reciprocating the cutter.

2. A hair clipper comprising two spaced plates of substantially constant thickness throughout their extent and having their end portions bent outwardly and then inwardly toward each other, the inwardly bent portions lying in substantially the same plane and bridging the space except for a narrow slot between the opposed ends of the plates, slots in the blades extending through and transversely of the outer bends and terminating short of the ends of the plates, and a movable cutter substantially filling the space between the bent portions of the plates and provided with spaced teeth extending across the cutter making shearing contact with the slotted portions of the plates and means for reciprocating the cutter.

3. A hair clipper comprising spaced spring steel plates having their end portions bent outwardly and then inwardly toward each other, the inwardly bent portions lying in substantially the same plane, slots in the plates extending through and transversely of the outer bends, a movable cutter substantially filling the space between the bent portions of the plates and provided with transverse spaced teeth, the plates exerting inward pressure on the cutter, thereby urging it into shearing contact with the slotted portions of the plates, a handle for supporting the plates, and means in the handle for reciprocating the cutter.

4. A hair clipper comprising two spaced plates having their end portions bent inwardly toward each other and lying in substantially the same plane, slots in the plates extending through and transversely of the bends, a two-part movable cutter between the plates, each part provided with transverse spaced teeth making shearing contact with one of the slotted portions of the plates, and means for reciprocating the cutter.

5. A hair clipper comprising two spaced plates having their end portions bent outwardly and then inwardly toward each other, the inwardly bent portions lying in substantially the same plane, slots in the plates extending through and transversely of the outer bends, a movable cutter substantially filling the space between the bent portions of the plates and divided longitudinally into two parts, each part provided with transverse spaced teeth making shearing contact with one of the slotted portions of the plates, and means for reciprocating the cutter.

6. A hair clipper comprising spaced spring steel plates having their end portions bent outwardly and then inwardly toward each other, the inwardly bent portions lying in substantially the same plane, slots in the plates extending through and transversely of the outer bends, a two-part movable cutter substantially filling the space between the bent portions of the plates, convex opposing contacting faces on the parts of the cutter, transverse spaced teeth on each part of the cutter, the plates exerting inner pressure on the cutter thereby urging the convex faces into contact and urging the teeth of each part into shearing contact with one of the slotted portions of the plates, and means for reciprocating the cutter.

7. A shearing element assembly for hair clippers comprising spaced spring steel plates having their end portions bent outwardly and then inwardly toward each other, the inwardly bent portions lying in substantially the same plane, slots in the plates extending through and transversely of the outer bends, and a movable cutter substantially filling the space between the bent portions of the plates and provided with transverse spaced teeth, the plates exerting inward pressure on the cutter, thereby urging it into shearing contact with the slotted portions of the plates.

8. A shearing element assembly for hair clippers comprising two spaced plates having their end portions bent outwardly and then inwardly toward each other, the inwardly bent portions lying in substantially the same plane, slots in the plates extending through and transversely of the outer bends, and a movable cutter substantially filling a space between the bent portions of the plates, and divided longitudinally into two parts, each part provided with transverse spaced teeth making shearing contact with one of the slotted portions of the plates.

9. A shearing element assembly for a hair clipper comprising spaced steel spring plates having their end portions bent outwardly and then returning inwardly toward each other, slots in said plates extending through and transversely of their outer bends and a movable cutter between the bent portions of the plates and provided with transverse teeth, said cutter having downwardly and outwardly sloping portions adjacent said teeth, the outwardly bent portions of said plates exerting inward pressure on said downwardly and outwardly sloping portions of said cutter whereby to urge its teeth into shearing contact with the inwardly bent and slotted portions of said plates.

RAYMOND KNAPP.